March 25, 1941.    G. R. LANMAN    2,236,409
TEETER BOARD
Filed Dec. 4, 1939
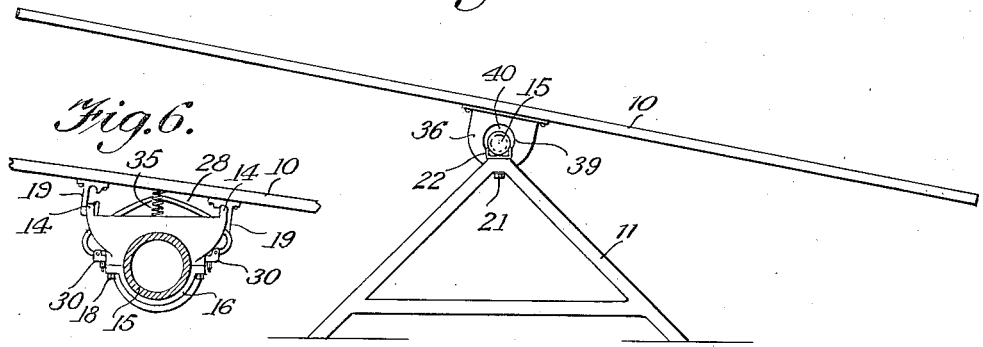
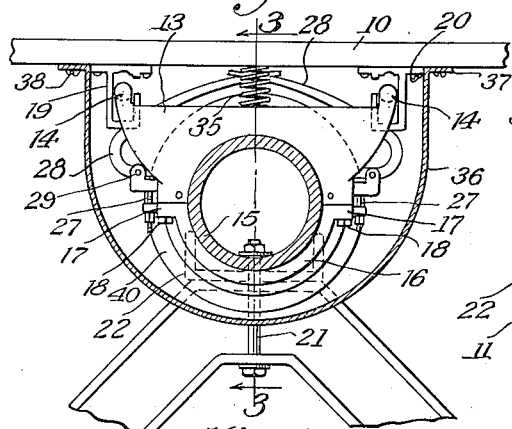
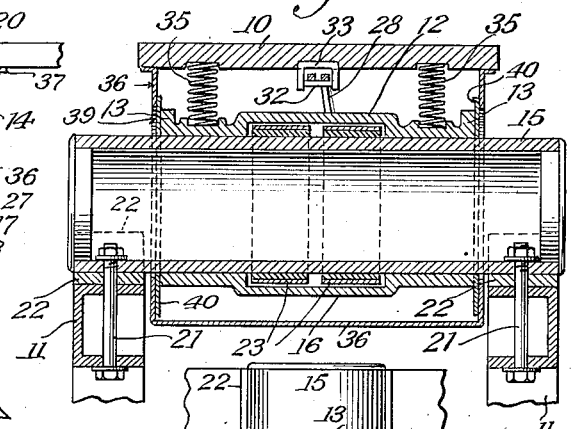
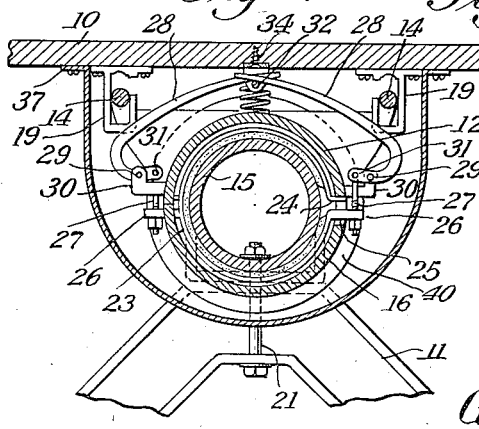
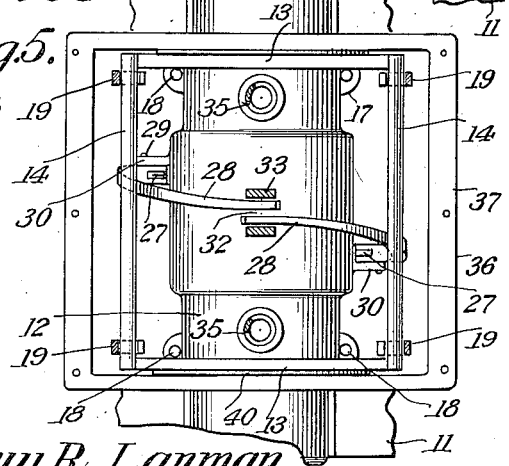
Guy R. Lanman
INVENTOR
BY Victor J. Evans & Co.
ATTORNEYS Patented Mar. 25, 1941

2,236,409

UNITED STATES PATENT OFFICE 2,236,409

TEETER BOARD

Guy R. Lanman, El Reno, Okla.

Application December 4, 1939, Serial No. 307,521

3 Claims. (Cl. 272—54)

This invention relates to teeter boards and has for an object to provide an automatic brake which will be actuated by one of the players getting off the board, and which will be devoid of levers or other outside devices to hurt the players or get out of order.

A further object is to provide a device of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a side elevation of a teeter board embodying an automatic brake constructed in accordance with the invention.

Figure 2 is an end elevation of the brake with the housing shown in sections.

Figure 3 is a longitudinal sectional view of the brake taken on line 3—3 of Figure 2.

Figure 4 is a cross sectional view of the brake showing both operating levers.

Figure 5 is a top plan view of the brake with parts in section.

Figure 6 is a fragmentary side elevation view of the teeter board with the brake applied.

Referring now to the drawing in which like characters of reference designate similar parts in the various views, 10 designates a see-saw or teeter board, and 11 substantially triangular channel legs which support the board.

The brake comprising the subject matter of the invention embodies a main frame consisting of a semi-cylindrical saddle bearing 12 having flanges 13 at both ends connected by cross bars 14, as best shown in Figure 5. The bearing is disposed upon the upper half of a tubular axle 15 and is held in place by a semi-cylindrical cradle bearing 16 having flanges 17 bolted to the lower faces of the flanges 13 as shown at 18 in Figure 2. The cross bars 14 are disposed in hook hangers 19 which are bolted to the bottom face of the teeter board as shown at 20. The tubular axle 15 is secured to the legs 11 of the teeter board by bolts 21 disposed outside of the cradle bearing 16 as shown in Figure 3. These bolts also are passed through U-shaped members 22 which support the ends of the axle 15. The saddle bearing 12 and the cradle bearing 16 are rotatable as a unit on the axle 15.

A pair of split ring resilient brake bands 23 are disposed to embrace the axle 15 within a centrally disposed enlargement on the saddle bearing 12, best shown in Figures 3 and 4. One end 24 of each brake shoe is engaged against the wall of a respective opening 25 formed in the bearing and the other end 26 projects through the opening and is equipped with an upright operating pin 27.

A pair of arcuate brake levers 28 are provided with inwardly curved lower ends which are pivoted as shown at 29 to respective lugs 30 which project from the bearing 12. The extreme lower ends of the levers are pivotally connected to the upper ends of the pins 27 by pivot pins 31. The upper ends of the levers are crossed side by side and engaged over a rod 32 which is carried by an inverted U-shaped yoke 33 which is secured to the bottom face of the teeter board by screws 34.

A pair of strong helical springs 35 are seated upon the top surface of the bearing 12 near the ends thereof and bear against the bottom face of the teeter board on opposite sides of the yoke 33. These springs normally tend constantly to lift the vacant end of the board and start operation of the brake at once.

When two players are seated on the ends of the teeter board their weight will depress the board vertically to compress the springs 35 and permit the yoke to rock the upper ends of the brake levers downwardly thereby forcing the pins 27 downwardly to expand and release the brake bands from engagement with the axle. Should either one of the players get off the teeter board this shifting of the weight causes the pin 32 to lift up on the brake levers 28 and the weight of the remaining player forces the hook hanger 19 on that side down to rest on the underlying cross bar 14, as shown in Figure 6, with consequent raising of the upper ends of the brake levers by the rod 32 to immediately apply the brake.

In practice, when the player at the low end of the board gets off, the high end of the board drops an almost inappreciable distance before the springs 35 lift the vacant end of the board with resultant raising of the yoke 33 which latter raises the brake levers 28 to apply the brake band 23 sufficiently tight to allow the high end of the board to slowly sink to the ground.

A housing 36 is disposed to enclose the brake mechanism and is provided at the upper edges with flanges 37 which are secured to the bottom face of the teeter board by screws 38. This housing prevents the clothing of children, or their hands, gaining access to the brake mechanism. The housing is provided with circular openings 39 at both ends which are of greater diameter than the diameter of the tubular axle 15 to allow vertical movement of the teeter board to operate the brake mechanism. A pair of washers 40 are disposed on the axle outside of the flanges 13 to seal the openings 39.

It will be observed that there are no levers projecting exteriorly of the brake mechanism housing 36 to injure the players and also that by shifting of the weight off center due to one of the players getting off the teeter board, the brake mechanism will be automatically applied.

From the above description it is thought that the construction and operation of the invention will be fully understood without further explanation.

What is claimed is:

1. The combination with a teeter board and the supporting legs therefor, of an axle fixed to the legs, a bearing means suspended from the teeter board revolvably receiving the axle, springs disposed between the teeter board and the bearing means, resilient brake bands within the bearing means embracing the axle, and brake levers connected to the brake bands and slidably connected to the teeter board, said levers being adapted to be released when the springs are compressed by the weight of players on the ends of the board, said springs immediately starting application of the brake by actuation of the brake levers when one of the players gets off the teeter board.

2. The combination with a teeter board and supporting legs therefor, of an axle fixed to the legs, a saddle bearing and a cradle bearing secured together to revolvably receive the axle springs disposed between the teeter board and the bearing means, flanges on the ends of the saddle bearing, transversely disposed cross bars connecting the flanges, hook hangers extending downwardly from the teeter board and receiving the cross bars near the ends therefor, a housing extending over the bearings and secured to the underneath face of the teeter board, resilient brake bands within the bearings embracing the axle, and brake levers pivotally connected to the brake bands and loosely connected to the teeter board, said brake levers being adapted to be initially applied by expansion of the springs to lift said loosely connected ends of the brake levers when said board is relieved of the weight of one of the players.

3. The combination with a teeter board and supporting legs therefor, of an axle fixed to the legs, bearing means loosely suspended from the teeter board and revolvably receiving the axle a pair of springs disposed between the ends of the bearing means and the bottom of the teeter board, a yolk secured to the bottom of the teeter board, carrying a transversely rod, a pair of brake bands disposed within the bearing means and embracing the axle, one end of each band being secured to the bearing means and the other end projecting from exteriorly of the bearing means, an upstanding pin carried by said projecting end of the brake band and a pair of levers having curved lower ends pivoted to said bearing means and pivotally connected at the extreme ends to said pins, said levers being crossed at the upper ends and projecting through said yolk and slidably engaging said transversely disposed rod of the yolk, the extreme upper ends of the levers being adapted to be engaged by the teeter board to rock the levers on their pivots and release the brake bands from the axle when the weight of players is disposed upon the ends of the teeter board, said springs being adapted to expand and start to apply the brake bands when the weight of one of the players is removed from the teeter board.

GUY R. LANMAN.